July 17, 1951   H. A. LOCKWOOD   2,561,127
DRINKING GLASS COASTER
Filed Jan. 5, 1949

INVENTOR.
HARRY A. LOCKWOOD
BY
ATTORNEY.

Patented July 17, 1951

2,561,127

UNITED STATES PATENT OFFICE 2,561,127

DRINKING GLASS COASTER

Harry A. Lockwood, Westport, Conn., assignor to Clark Metal Products, Inc., Fairfield, Conn., a corporation of Connecticut Application January 5, 1949, Serial No. 69,267

2 Claims. (Cl. 65—53)

1

The present invention relates to an improvement in coasters for attachment to drinking glasses, and has for its object to provide a device of this character having suction cup means arranged to grip the bottom of the glass by pressing it into contact therewith, and further having an annular well to catch the condensation forming on the outer side of the glass and entrap it so that it will not spill out of the coaster as the glass is tilted. A further object is to provide a coaster which may be removably attached to the bottom of the glass, and which will support the glass in a relatively stable manner so that it will not wobble or tip, and to this end it is proposed to provide an annular ridge surrounding the suction cup for engagement with the bottom of the glass in outwardly spaced relation to the suction cup.

With the above and other objects in view, an embodiment of the invention is shown in the accompanying drawing, and this embodiment will be hereinafter more fully described with reference thereto, and the invention will be finally pointed out in the claims.

In the drawings.

Similar reference characters indicate corresponding parts throughout the several figures of the drawings.

Figure 1:
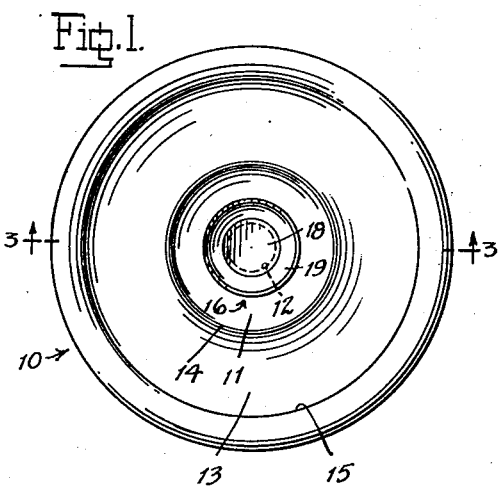
Fig. 1 is a top plan view of the coaster according to the illustrated exemplary embodiment of the invention.
Figure 2:
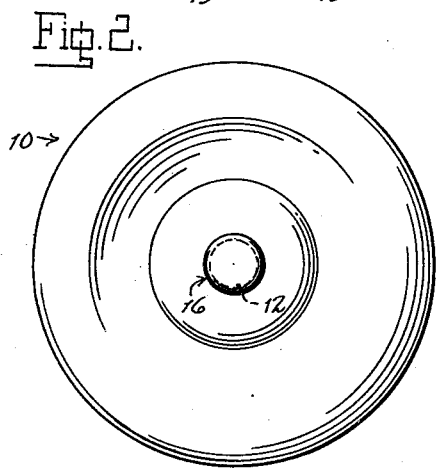
Fig. 2 is a bottom plan view.

Referring to the drawings the coaster, according to the illustrated exemplary embodiment of the invention, comprises a generally dished shaped body member 10 formed of sheet metal, plastic or other suitable material, and which consists of a central recessed portion 11 having a flat central portion provided with circular aperture 12, the outer margin of the recessed portion 11 being curved upwardly and joined with the inner edge of an annular recessed portion 13 to form an annular ridge 14 for engagement with the bottom of the glass as will presently more fully appear. The base of the recessed portion 11 is upwardly offset with respect to the base of the recessed portion 13 to provide a central clearance space. The annular recessed portion 13 is extended upwardly and inwardly at its outer periphery and is curled downwardly to provide an annular lip 15, which is adapted to entrap condensation disposed in the annular recess 12 when the glass is tilted, so that the condensation is effectually prevented from spilling.

A suction cup 16 is secured in the aperture 12, being provided with an annular groove 17 in which the edge of the aperture is engaged. The upper side of the suction cup is provided with a relatively flat surface 18 surrounded by an outwardly diverging wall 19, the surface 18 being normally in substantially the same plane as the annular ridge 14.

Figure 4:
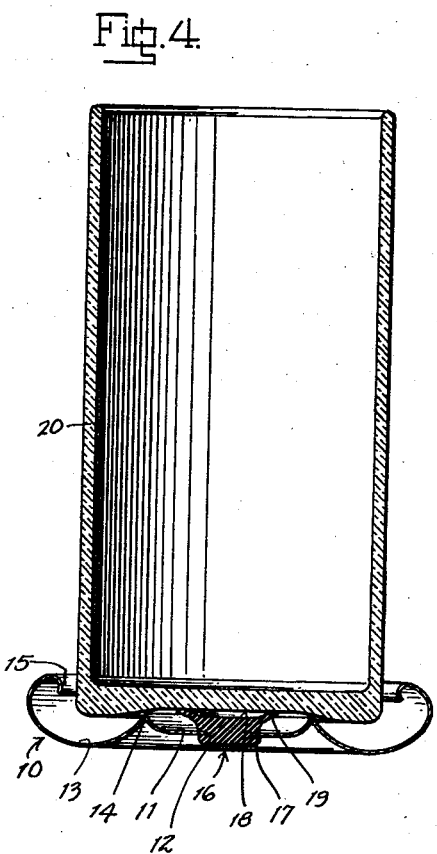
Fig. 4 is a vertical sectional view showing a drinking glass attached to the coaster.
Figure 3:
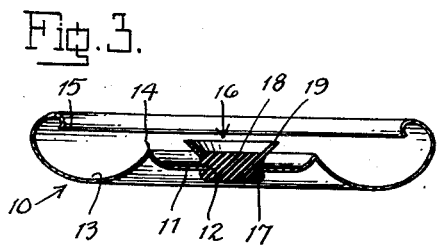
Fig. 3 is a vertical sectional view taken along the line 3—3 of Fig. 1.

The glass 20 is attached to the coaster as shown in Fig. 4, the bottom of the glass being first moistened to insure sealing contact with the edge of the wall 19 and the glass being thereupon pressed downwardly to spread the wall downwardly and outwardly, thus creating a vacuum within the suction cup to retain the glass. As the surface 18 of the suction cup is substantially flush with the ridge 14 practically all of the air will be exhausted in the suction cup as the bottom of the glass is pressed into contact with the ridge, so that as the glass is released a relatively great suction effect is produced to firmly hold the glass. The bottom of the usual glass is slightly concave so that in the engaged relation it will approximately contact the ridge 14 to thus provide substantially solid support for the glass. The coaster will hold glasses of different sizes varying between a minimum size slightly greater than the diameter of the ridge 14 and a maximum size slightly smaller than the diameter of the lip 15, it being pointed out that in any case the surface of the glass should be sufficiently spaced from the lip 15 to permit condensation running down the side of the glass to drop into the annular recess 13 without contacting the lip 15.

I have illustrated and described a preferred and satisfactory embodiment of the invention, but it will be understood that changes may be made therein within the spirit and scope thereof as defined in the appended claims.

What is claimed is:

1. A drinking glass coaster comprising a rigid body member including a central recessed portion having a centrally disposed aperture, an annular recessed portion surrounding said central recessed portion, an annular rigid ridge portion integral with and connecting said recessed portions and having an upper edge disposed in a horizontal plane, and a suction cup member secured in said aperture in inwardly spaced relation to said ridge portion and having its upper edge normally in a horizontal plane spaced above the horizontal plane of the upper edge of said ridge portion.

2. A drinking glass coaster comprising a rigid body member including a central recessed portion having a centrally disposed aperture, an annular recessed portion surrounding said central recessed portion, a rigid annular ridge portion integral with and connecting said recessed portions and having an upper edge disposed in a horizontal plane, and a suction cup member secured in said aperture in inwardly spaced relation to said ridge portion having a pocket in its upper side having a flat bottom surface disposed substantially in the same plane as the upper edge of said ridge portion and an outwardly diverging annular wall surrounding and extending upwardly from said bottom surface and having its upper edge normally in a horizontal plane spaced above the horizontal plane of the upper edge of said ridge portion.

HARRY A. LOCKWOOD.

REFERENCES CITED

The following references are of record in the file of this patent:

UNITED STATES PATENTS

| Number | Name | Date |
| --- | --- | --- |
| 791,097 | Jericho | May 30, 1905 |
| 807,548 | Ganswindt | Dec. 19, 1905 |
| 937,850 | Parker | Oct. 26, 1909 |
| 1,587,874 | Strickland | June 8, 1926 |
| 1,925,241 | Fullerton | Sept. 5, 1933 |
| 2,113,888 | Kaparin | Apr. 12, 1938 |
| 2,345,784 | Wolcott | Apr. 4, 1944 |

FOREIGN PATENTS

| Number | Country | Date |
| --- | --- | --- |
| 810,717 | France | Jan. 6, 1937 |